Nov. 17, 1925.  1,561,776
V. R. COLLARD
RESILIENT SUSPENSION DEVICE FOR AUTOMOBILES AND LIKE VEHICLES
Filed March 20, 1923    2 Sheets-Sheet 1
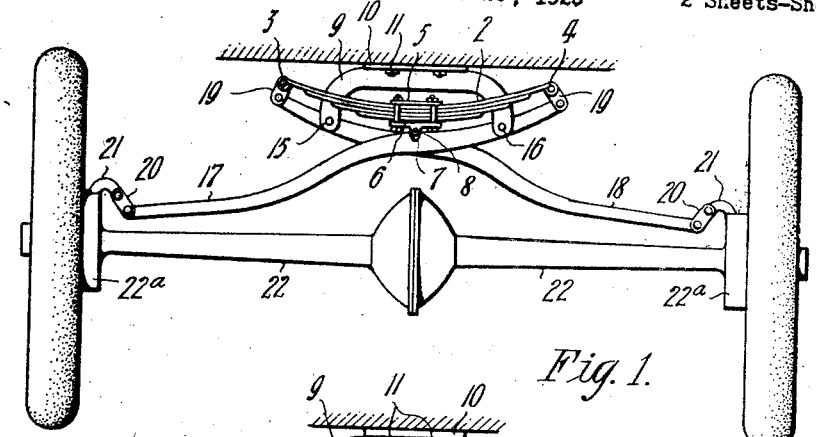
Fig. 1.
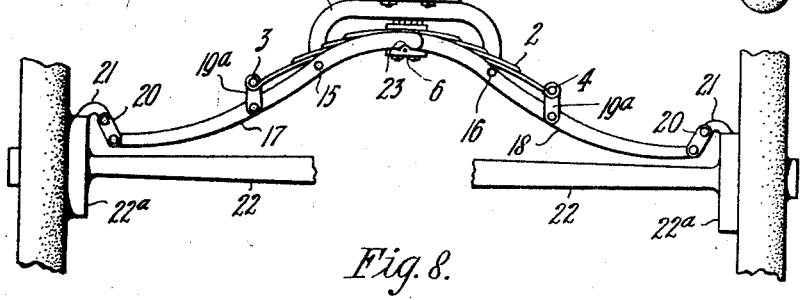
Fig. 8.
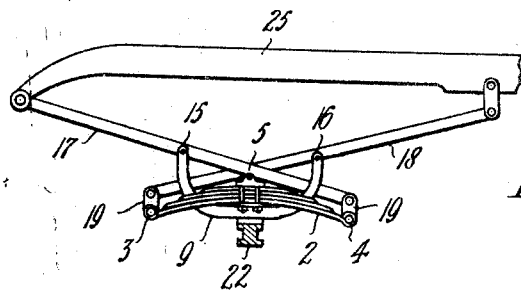
Fig. 9.
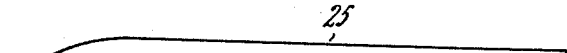
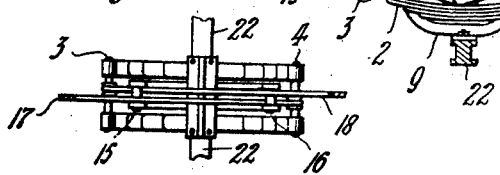
Fig. 10.
Fig. 11.
INVENTOR:
VICTOR R. COLLARD,
By John O. Seifert
Atty.

Nov. 17, 1925.　　　　　　　　　　　　　　　　1,561,776
V. R. COLLARD
RESILIENT SUSPENSION DEVICE FOR AUTOMOBILES AND LIKE VEHICLES
Filed March 20, 1923　　　2 Sheets-Sheet 2
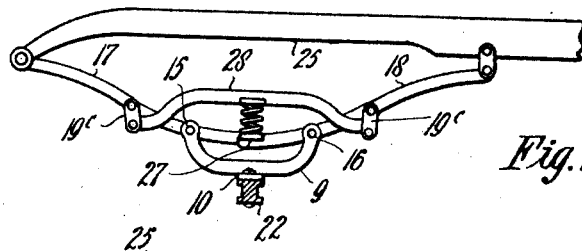
Fig. 13.
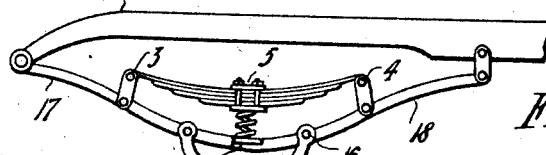
Fig. 12.
Fig. 3.
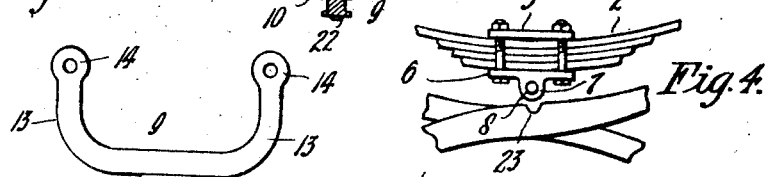
Fig. 4.
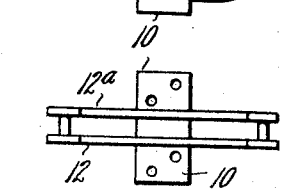
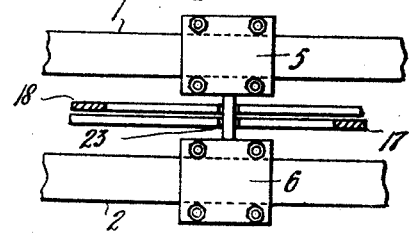
Fig. 5.　　Fig. 2.　　Fig. 6.
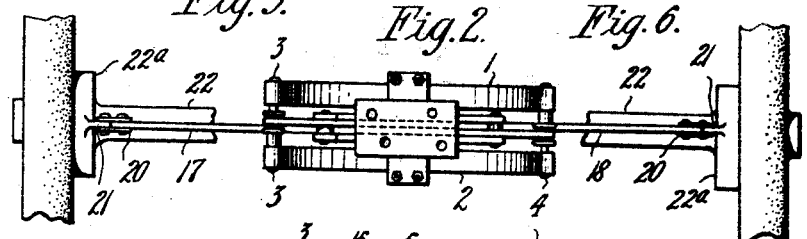
Fig. 7.
INVENTOR:
VICTOR R. COLLARD,
By John O. Seifert
Atty Patented Nov. 17, 1925.

1,561,776

UNITED STATES PATENT OFFICE.

VICTOR RAOUL COLLARD, OF BALACLAVA, VICTORIA, AUSTRALIA.

RESILIENT SUSPENSION DEVICE FOR AUTOMOBILES AND LIKE VEHICLES.

Application filed March 20, 1923. Serial No. 626,266.

*To all whom it may concern:*

Be it known that I, VICTOR RAOUL COLLARD, a subject of the King of Great Britain, residing at Balaclava, in the State of Victoria, Commonwealth of Australia, have invented new and useful Improvements in Resilient Suspension Devices for Automobiles and like Vehicles, of which the following is a specification.

This invention relates to an improved resilient suspension means for the bodies of motor-cars and similar self-propelled vehicles, which will function efficiently in absorbing road shocks consequent upon a vehicle travelling over an uneven roadway, and in readily responding to the concussive force produced when the wheels encounter ruts or strike obstacles on the roadway.

The invention has been devised with the object of providing a resilient suspension device of such a character as will minimize as far as possible forward and backward end throw and lateral sway, and absorb concussive shocks due to the up and down motion that is caused by deflection and recoil of the springs, while tending to prevent excessive strain on the transmission mechanism of the vehicle and to preserve freedom of movement of the springs.

The improved resilient suspension device for vehicles according to the present invention comprises essentially a pair of levers having a pivotal connection with the chassis and axle, with springs pivotally connected at opposite ends with and supported by the levers and arranging the said springs and levers to cause the levers to exert pressure upon the springs intermediate the ends thereof and simultaneously exert a force or pressure on the end portions of the springs under conditions of shocks imparted to the axle and chassis through the traction wheels.

Constructions of improved resilient suspension devices that are representative of and are according to my invention are illustrated in the accompanying drawings, wherein:—

Figure 1 is a view in elevation of a rear end resilient suspension as applied to a motor-car which may be of that type, which ordinarily has a single transverse spring at each end of the chassis.

Figure 2 is a plan of Figure 1.

Figures 3 and 4 are views in elevation of details hereinafter fully described.

Figures 5 and 6 are views in plan of Figures 3 and 4, respectively.

Figures 7 and 8 illustrate modifications in the rear resilient suspension means shown by Figures 1 and 2.

Figures 9 and 10 are views in elevation and in plan, respectively, of a resilient suspension device arranged longitudinally of the chassis.

Figures 11, 12 and 13 illustrate in elevation modifications of the resilient suspension device seen in Figure 9.

Referring now to Figures 1 to 5 of the drawings, the numerals 1 and 2 designate a pair of laminated leaf springs of semi-elliptical shape, which are arranged in parallel relationship transversely of the chassis, at the rear end thereof and are coupled at their ends by pins 3 and 4. These springs are clamped centrally between plates 5 and 6 and rigidly maintained in position by U-shaped bolts or other approved fastenings, while the two lower of said clamp plates have on their under surfaces apertured bosses 7 accommodating a longitudinal fulcrum pin 8.

A bracket 9—see Figures 3 and 5—is rigidly secured transversely to the chassis by means of a fixture plate 10 and bolts 11. This bracket has two members 12 and 12ª in parallel spaced relationship with integrally formed and curved end arms 13 which terminate in eyes or apertured bosses 14 supporting fulcrum pins 15 and 16.

Two levers 17 and 18 substantially of the configuration seen in Figure 1 are arranged transversely of the chassis and have their inner end portions overlapping. These levers are fulcrumed on opposite sides of the longitudinal centre line of the chassis on the pins 15 and 16, respectively, carried by the bracket 9, and they have their inner ends pivotally connected by means of short shackles 19 to the pins 3 and 4 which couple the opposite ends of the laminated springs 1 and 2.

The levers 17 and 18 are also pivotally connected at their outer lower ends by means of short shackles 20 to brackets 21 fixedly mounted on the housings 22ª of the axle 22. Formed in each of said levers is a gap or recess 23 (see Figure 6) which is in such a position as to adapt it for operative engagement with the fulcrum pin 8 carried by the bosses 7 on the lower spring clamping plates 6.

Any upward movement imparted to one wheel—as for example the near side wheel—by striking an obstacle or by encountering a rut or other road-surface irregularity, causes the lever 17 to fulcrum on the pin 16 and thereby draw downwardly the further end portions of the springs 1 and 2 coupled by the pin 4 and increase the tension of such springs. Simultaneously, engagement is effected between the recessed portion of said lever and the fulcrum pin 8, whereby an upward force is applied to the central portions of said coupled springs to further increase their tension. Owing to the overlapping levers 17 and 18 being pivotally swung, both at their upper and at their lower ends, and to the fact that the upper extremities of said levers are pivotally connected to the opposite ends of the coupled springs 1 and 2, there is set up a compensating action between the two said levers, whereby the full resilient scope of said springs is utilized and the concussive jar imparted to the wheel is effectively absorbed and is not transmitted to the vehicle body.

According to the embodiment shown in Figure 7 of the drawings, the use of the bracket 9, for affixture to the chassis in the manner hereinbefore described, is dispensed with, and the overlapping levers 17 and 18, instead of being fulcrumed to said bracket, fulcrum directly at 15 and 16, respectively, on a beam or member 24 of the chassis, which is capable of being done in some designs of motor-vehicle.

In the embodiment illustrated by Figure 8, the semi-elliptical springs 1 and 2 are inverted, that is to say, the shortest leaf of each is uppermost. The levers 17 and 18 are pivotally connected, from positions equidistantly from, but exteriorly of, their fulcruming points 15 and 16, to the ends of the coupled springs by means of short shackles 19$^a$, and the inner end portions of said levers, which are gapped at 23, are shortened and maintained in constant engagement with the longitudinally arranged fulcrum pin 8 supported by the lower of the plates, between which the central portions of said springs are clamped.

The constructions of improved resilient suspension devices embodied in Figures 9 and 10, 11, 12 and 13 are for a motor-vehicle wherein the springing devices are arranged on opposite sides and in longitudinal relationship with the chassis, and the compensatory movements of the fulcrumed levers in co-action with spring elements will be at once understood, from the explanation of the operation of the transversely arranged suspension device hereinbefore contained.

In the embodiment illustrated by Figures 9 and 10, the bracket 9 having its arms 13 extending upwardly is fitted to the axle 22, and the fulcruming points 15 and 16 of the overlapping levers 17 and 18 are equidistantly from and on opposite sides of the axle. The upper ends of said levers are pivotally connected to a side beam or member 25 of the chassis, while their lower extremities are pivotally connected to the pins 3 and 4 that couple the opposite ends of the inverted and longitudinally arranged springs 1 and 2.

In the embodiment shown in Figure 11, the inner ends of the levers 17 and 18 are shortened and are in operative engagement with a transverse fulcrum pin 8$^a$ carried by the upper clamp plate 5 of the coupled springs and disposed in vertical alignment with and above the axle 22, while the opposite ends of said springs are pivotally connected to the fulcrumed levers 17 and 18 by short shackles 19$^b$. If desired, the semi-elliptical springs may be arranged between the chassis member 25 and the fulcrumed levers 17 and 18, and coiled compression springs 26 may be interposed between the lower clamp plate 6 and a seating plate 27 superimposed on the adjacent inner ends of said levers—see Figure 12. Alternatively, vertically arranged compression springs 26 may be employed in association with a rigid rod or bar 28, the opposite ends of which are downwardly curved and pivotally connected by means of shackles 19$^c$ to the levers 17 and 18—see Figure 13.

In this last-mentioned construction, the rigid rod or bar is supported upon compression springs and as it has its ends pivotally connected to the pivotally swung and fulcruming levers, it functions similarly to a semi-elliptical spring, but with less sensitive resiliency.

It will be understood that the invention is equally applicable to the front and to the rear end suspension means of a motor-car or like vehicle, and that modifications in matters of design, details of construction and arrangement may be made therein within the scope of the appended claims.

What I claim is:—

1. In a resilient suspension for motor vehicles, the combination with the vehicle chassis and axle, of a pair of levers pivotally connected at their outer ends to a fixed part of the vehicle, springs coupled together at their ends and pivotally connected at said coupled ends to and supported by the levers, and said levers adapted to engage and exert pressure on the springs intermediate the ends thereof simultaneously with the exertion of pressure on the end portions of the springs under conditions of shocks transmitted to the traction wheels of the vehicle.

2. In a resilient suspension for motor vehicles, the combination with the vehicle chassis and axle, of a bracket fixed to the chassis, a pair of levers having a fulcrum support on said bracket and having a pivotal connection with the axle, springs supported by said levers, and a fulcrum pin carried by said springs intermediate the ends thereof and adapted for engagement by said levers for the purpose specified.

3. In a resilient suspension for motor vehicles, the combination with the chassis and axle, of a bracket fixed to the chassis, a pair of intersecting levers fulcrumed on said bracket and pivotally connected at one end to the axle, leaf springs arranged in parallel relation and coupled together at the opposite ends, and said springs being pivotally connected to and supported by said levers intermediate the ends thereof, and said levers being arranged to have a fulcrum support on said spring intermediate the connection thereof with the bracket.

4. A resilient suspension for motor vehicles, according to claim 3, wherein the connection of the lever with the springs is at the ends opposite to the connection of the levers with the axle.

5. In a vehicle suspension, the combination with the chassis and the axle, of a pair of levers each lever having a pivotal connection with the chassis and axle and both levers having a common fulcrum support to support the chassis from the axle and permit the chassis and axle to have movement toward and away from each other, a pair of leaf springs one end of the springs having a pivotal connection with one lever and the other end of the springs having a pivotal connection with the other lever, said springs being adapted to normally exert a force upon the levers to urge the chassis and axle in a direction away from each other and resist movement of the chassis and axle toward each other, and said levers adapted to have a fulcrum support intermediate the ends of the springs when the levers assume a certain position to exert a bending stress upon the springs to absorb the shock of a sudden movement of the axle toward the chassis.

In testimony whereof I affix my signature.

VICTOR RAOUL COLLARD.